United States Patent
Dewost

(10) Patent No.: US 11,531,746 B2
(45) Date of Patent: Dec. 20, 2022

(54) METHOD FOR ELECTRONIC SIGNING OF A DOCUMENT BY A PLURALITY OF SIGNATORIES

(71) Applicant: Phileos Consulting, Boulogne-Billancourt (FR)

(72) Inventor: Philippe Dewost, Boulogne-Bil-Lancourt (FR)

(73) Assignee: Phileos Consulting, Boulogne-Billancourt (FR)

( * ) Notice: Subject to any disclaimer, the term of this patent is extended or adjusted under 35 U.S.C. 154(b) by 118 days.

(21) Appl. No.: 16/637,435

(22) PCT Filed: Jul. 31, 2018

(86) PCT No.: PCT/FR2018/051968
§ 371 (c)(1),
(2) Date: Mar. 5, 2020

(87) PCT Pub. No.: WO2019/030445
PCT Pub. Date: Feb. 14, 2019

(65) Prior Publication Data
US 2020/0201978 A1     Jun. 25, 2020

(30) Foreign Application Priority Data
Aug. 9, 2017  (FR) ...................................... 1757596

(51) Int. Cl.
*G06F 21/36* (2013.01)
*G06F 21/32* (2013.01)
*G06F 21/64* (2013.01)

(52) U.S. Cl.
CPC .............. *G06F 21/36* (2013.01); *G06F 21/32* (2013.01); *G06F 21/64* (2013.01)

(58) Field of Classification Search
CPC ........... G06F 21/36; G06F 21/32; G06F 21/65
See application file for complete search history.

(56) References Cited

U.S. PATENT DOCUMENTS

| 2004/0135902 A1* | 7/2004 | Steensma ................ G06F 16/58 |
| | | 707/E17.112 |
| 2013/0043302 A1* | 2/2013 | Powlen .................. G06Q 50/01 |
| | | 235/494 |

(Continued)

FOREIGN PATENT DOCUMENTS

| WO | 2016/128569 A1 | 8/2016 |
| WO | 2016/164496 A1 | 10/2016 |
| WO | 2017/071581 A1 | 5/2017 |

OTHER PUBLICATIONS

Anonymous, How to Encourage Active Streets Using QR Code Technology, https://www.health.act.gov.au/about-our-health-system/healthy-living/its-your-move/its-your-move-schools, Oct. 10, 2016.

(Continued)

*Primary Examiner* — Ali S Abyaneh
(74) *Attorney, Agent, or Firm* — TraskBritt

(57) ABSTRACT

A method for electronic signing of a document by a plurality of signatories comprises a step of acquiring a photograph of at least one of the signatories and identifying the signatory using the photograph, and a step of associating the document in a digital form with the identified signatory, wherein the method comprises: a prior step of calculating a matrix code by a cryptographic processing TC applied to the document, the step of acquiring a photograph consisting of acquiring a photograph of at least one signatory bearing a physical medium representing the matrix code, a step of validating: the identity of the signatory on the photograph and, the conformity of the matrix code calculated by the cryptographic processing TC applied to the document held by a signatory, with the matrix code on the photograph.

11 Claims, 3 Drawing Sheets

---

11 Calculation of the QR code

12 Acquisition of the photograph with the signatory(ies) bearing QR code

13 Validation of the identity of the signatory and compliance with the QR code 14 recording of the photograph

(56) References Cited

U.S. PATENT DOCUMENTS

| | | | |
|---|---|---|---|
| 2015/0026478 A1 | 1/2015 | Raduchel | |
| 2015/0149324 A1* | 5/2015 | Szymanski | G06Q 30/0635 |
| | | | 715/224 |
| 2015/0269692 A1* | 9/2015 | Ryan | G06Q 10/00 |
| | | | 705/311 |
| 2019/0354822 A1* | 11/2019 | Pic | G07D 7/2033 |
| 2020/0036714 A1* | 1/2020 | Chen | G06F 21/32 |

OTHER PUBLICATIONS

Anonymous, With PayToo Your Face Becomes Your Signature, https://markets.businessinsider.com/news/stocks/with-paytoo-your-face-becomes-your-signature-1001920599, Apr. 13, 2017.

International Search Report for International Application No. PCT/FR2018/051968 dated Sep. 13, 2018, 3 pages.

International Written Opinion for International Application No. PCT/FR2018/051968 dated Sep. 13, 2018, 6 pages.

\* cited by examiner

| 11 Calculation of the QR code |

| 12 Acquisition of the photograph with the signatory(ies) bearing QR code |

| 13 Validation of the identity of the signatory and compliance with the QR code |

| 14 recording of the photograph |

Fig.1

Step 1: pre-determined contract QR code

Step 2: N signatories meet

Step 3: N signatories with QR code representation

Step 4: Acquisition of a photograph transmitted to an identification service

Step 5: Identified signatories, the identification service signs on the photograph and transmits to the signatories for cross-checking Step 6: photograph QR code signed in step 5 recorded in a notarization registry

Fig. 2

|    | T1       | T2       | T3       | T4       |
|----|----------|----------|----------|----------|
| S1 | Active   | inactive | inactive | inactive |
| S2 | inactive | Active   | inactive | inactive |
| S3 | inactive | inactive | Active   | inactive |
| S4 | inactive | inactive | inactive | Active   |
| If | inactive | inactive | inactive | inactive |

Fig. 3

METHOD FOR ELECTRONIC SIGNING OF A DOCUMENT BY A PLURALITY OF SIGNATORIES

CROSS-REFERENCE TO RELATED APPLICATIONS

This application is a national phase entry under 35 U.S.C. § 371 of International Patent Application PCT/FR2018/051968, filed Jul. 31, 2018, designating the United States of America and published as International Patent Publication WO 2019/030445 A1 on Feb. 14, 2019, which claims the benefit under Article 8 of the Patent Cooperation Treaty to French Patent Application Serial No. 1757596, filed Aug. 9, 2017.

TECHNICAL FIELD

This disclosure relates to the field of the constitution of probative evidence of the consent of a plurality of signatories on a document to be signed. More particularly, the disclosure applies to the field of electronic signing of documents, in particular, contracts, for which verification of the signatory's identity and authority is required in order to provide each party with proof of the consent of the other parties associated with the document at issue. It also covers the signing of contracts requiring the signatories' simultaneous physical presence.

BACKGROUND

Traditionally, after an agreement has been negotiated, the different parties physically meet for a "signing ceremony" during which each party signs, within the same time interval, a series of copies of the same document, initialing each page and signing certain key pages. This confirms that the other parties have agreed to the reference document that they themselves have accepted.

Sometimes, rather than initialing each page, the document is irreversibly bound by a "notarized binding" that allows only one page to be signed, inseparable from the other pages of the document unless the notarized binding is destroyed.

When a physical meeting is not possible, it also happens that the signing ceremony is done by circulating the documents successively signed by each of the parties. The reference document is signed by a first party who transmits it to the second party by mail, for example. The second party adds its signature to the document already signed by the first party, and so on. The last signatory shall then transmit to each of the other parties a copy bearing all the signatures.

For an electronic document, different solutions have been proposed in the state of the art and are presented below.

The electronic signature is traditionally based on the application of an asymmetric cryptographic encryption operation using a private key applied to a cryptographic footprint of the document to be signed.

The soundness of the solution is based on the assumption that the private key remains truly secret, can be used exclusively by the signatory, and that the signatory can be identified. Smart card systems are particularly suited to provide this assurance.

Despite the mass distribution of smart cards, their use remains complicated for most users, as they are far from everyday life habits: most laptops and smartphones are not equipped with smart card readers but do have a front camera. Moreover, in the contractual field, the handwritten signature is still accompanied by cumbersome "signature card" procedures for establishing, validating or revoking authorizations.

When the document is signed, there is still the problem of electronic notarization of documents. Patent application US2015/0026478 describes a server that receives a data packet comprising: a document for notarization, identification information including a photograph, the user's photograph and the user's signature. The server compares the user's photograph to the photograph included in the identification information to verify the user's identity. When identity is confirmed, the server applies the signature and a notarization indication to the document designated for notarization to create a notarized version of the document. The server stores the notarized version of the document, the photograph and the identification information in a secure data packet and provides the user with the notarized version of the document.

This patent application solves the issue of assigning the electronic signature to a single person on a document to be signed. However, a method for providing conclusive evidence of signatures on a document for a group of signatories is missing.

An alternative solution is presented in international patent application WO 2017/071581 describing a method for generating electronic contract signatures, consisting in:

- obtaining, through an electronic contract system, a user's handwritten signature image;
- getting an intermediate signature image;
- generating a complete digital summary;
- generating a first digital signature, generating a second digital signature, and obtaining a complete encrypted digital summary;
- sending the second digital signature, the complete encrypted digital summary and a random number to a trusted time-stamp proxy;
- using a second key of a first pair of keys to decrypt the second digital signature and comparing the random number obtained through decryption with a random number received, so as to confirm the validity of the identity of the electronic contract system;
- if it is confirmed that the electronic contract system identity is valid, using a second key of a second pair of keys to decrypt the full encrypted digital summary;
- obtaining a third digital signature and a fourth digital signature, then sending the fourth digital signature, the third encrypted digital signature and a time-stamp to the electronic contract system; and
- getting a final signature image.

The international patent application WO 2017/117669 offers an alternative prior art solution for an electronic document signature, providing better authentication of the particular electronic document in an electronic contract management platform. An individual who wishes to sign an electronic document electronically, can apply a digitized graphic representation of his or her physical signature (in an adaptive vector graphics format (SVG)) to the electronic document, and also embed a digital certificate (an X509 digital certificate) of the individual signing on the electronic document. The hybrid signing method can incorporate multi-factor authentication of users so that only properly authenticated users can be authorized to access the platform and be authorized to electronically sign electronic documents, thus providing greater security.

Drawbacks of the Prior Art

The solutions of the prior art are not totally satisfactory because they require the implementation of applications whose actual functioning cannot be perceived by the user. He/she is, therefore, obliged to make a "leap of faith" on the effects resulting from the processing applied, and on the level of confidence he/she can really place in the result of this succession of processings that he/she does not directly control and whose principles and effects he/she cannot directly perceive. In particular, it is impossible for him/her to directly and objectively verify possible failures or fraud, and the evidence generally takes the form of a digital sequence whose significance is not directly perceptible.

Despite the mass distribution of cryptographic solutions, particularly those using smart cards, their use remains complicated for most users, as they are far from everyday life habits: most laptops, telephones and tablets are not equipped with smart card readers but do have a front camera. Moreover, in the contractual field, the handwritten signature is still accompanied by cumbersome "signature card" procedures for establishing, validating or revoking authorizations.

BRIEF SUMMARY

The disclosure describes a simple and satisfactory solution, which consists in relying on the technique of self-portrait ("selfie"), i.e., a photo of oneself taken by oneself using the front camera of a cell phone (smartphone) or a tablet, to establish the consent of a group of individuals for the implementation of a contract.

Optionally, it is based on the state of the art as regards face recognition (which makes it possible to identify individuals and thus to access their identity and credentials by electronic means) and adds proof of simultaneity, presence and consent, as well as the purpose of the consent.

The document to be signed is communicated in advance so that a cryptographic footprint can be read and calculated using suitable viewing software. Once consent has been obtained through discussion, individuals can take turns taking a group selfie, where all other participants can display the cryptographic footprint on their own smartphones.

The "selfies" are duly time-stamped and notarized by the telephone, in which the geolocation of the photos has been previously activated. Notarization is carried out by means of a notarization server. Proof of the consent of individuals to the contract is thus available, as the verification of consistency and non-alteration of the photos can be legally established by expertise, as for a handwritten signature.

To this end, the disclosure relates to a method for electronic signing of a document by a plurality of signatories, comprising a step of acquiring a photograph of at least one of the signatories and identifying the signatory using the photograph, and a step of associating the document in a digital form with the identified signatory, wherein the method comprises:
  a step of preliminarily calculating a matrix code by a cryptographic processing TC applied to the document,
  the step of acquiring a photograph consisting of acquiring a photograph of at least one signatory bearing a physical medium representing the matrix code,
  a step of validating:
    the identity of the signatory on the photograph, and
    the conformity of the matrix code calculated by the cryptographic processing TC applied to the document held by a signatory with the matrix code on the photograph.

According to one embodiment, the photograph is taken in the presence of all the signatories and at least one representation of the matrix code.

According to another embodiment, the photograph is taken in the presence of only some of the signatories and at least one representation of the matrix code, and then transmitted to the signatories not shown on the photograph.

The disclosure may also provide for one and/or the other of the following aspects considered alone or in possible multiple combinations:
  each signatory calculates with a piece of personal equipment the matrix code by applying the cryptographic processing TC to the document to be signed that he/she has at his/her disposal,
  the matrix code is calculated by a single piece of equipment and transmitted to each of the signatories,
  the step of validating the identity of the signatory photographed by the other signatory or signatories is carried out by automatic face recognition,
  the step of validating the identity of a signatory photographed by a signatory is performed by the activation of a recognition function by the signatory receiving the photograph of one or more other signatory(ies),
  the signatory having taken the photograph transmits to at least one other signatory a digital file containing the photograph in a digital form, the QR code displayed when the photograph was acquired,
  the digital file also includes geolocation information of the place of acquisition of the photograph,
  the digital file further includes time-stamp information of the acquisition of the photograph,
  the step of acquiring the photograph includes the acquisition of a video sequence.

BRIEF DESCRIPTION OF THE DRAWINGS

Other characteristics and advantages of the disclosure will appear in the description that follows relative to detailed embodiments, and referring to the attached figures that represent respectively:
  FIG. 1 illustrates the general steps of a method for electronic signing,
  FIG. 2 illustrates a first embodiment, and
  FIG. 3 illustrates a second embodiment.

DETAILED DESCRIPTION

The method for electronically signing a document involves several steps as shown in FIG. 1.

A first step 11 involves calculating a cryptographic print beforehand by means of a cryptographic processing TC applied to a document to be signed (for example, an agreement, a document or a contract). A cryptographic footprint can be obtained using a classical hash algorithm recognized for electronic signing, such as SHA2 or SHA3. This footprint can be displayed on a telephone or tablet screen, or printed on paper using QR-Code or an equivalent matrix code. A contract QR code is calculated either independently by each signatory with his/her personal phone or collectively using a single piece of equipment and then transmitted to each signatory's phone.

When the QR code is calculated individually by each signatory, each is assured that the document he/she has submitted to the cryptographic processing TC is indeed the one he/she has read and approved, and that the cryptographic processing TC has not been defrauded since it is his/her own piece of equipment, running an application under his/her control.

When the QR code is calculated by a common resource, each of the signatories is assured that it is associated with the same document. He/she may also, if necessary, verify that this document is the one he/she had read and approved by applying the cryptographic processing TC to a document in his/her possession, and comparing it with the QR code calculated by the common resource.

A second step 12 involves taking a photograph of all signatories with the calculated QR code. This photograph may be taken by one of the signatories in the form of a self-portrait of the group of signatories each bearing a representation of the QR code associated with the document, for example, on the screen of a tablet or a telephone held by one or more signatory(ies), or on a document on which the QR code is printed.

A third step 13 involves validating the identities of the signatories and the QR code of the documents appearing in the photograph. This validation can be carried out either manually by an action on an interface presenting the photograph as well as validation or rejection zones allowing a party to order the recording of information corresponding either to the recognition and identification of the other signatories (acknowledgement by an "OK" type command) or to the non-recognition of one or more signatory(ies) (rejection by a "NO" type command).

A fourth step 14 involves recording and signing the photograph as a proof in a registry at the notarization server.

The notarization server may be operated by a trusted provider, or it may be based on a collaborative notarization system of the "blockchain" type. Several notarization systems can be used together to support the proof. The application extends to cases in which the "selfie" can be replaced or supplemented by a short video sequence, with or without sound recording, so as to make it even more difficult to counterfeit the signing ceremony.

FIG. 2 illustrates a first embodiment of the method for electronic signing. A QR code of the contract is made available to each signatory. The N signatories meet in the same place to give their consents. They take a photograph of all the signatories, at least one of whom bears a representation of the QR code of the contract. The photograph is then transmitted to a third party identification service that can certify identity through automatic face recognition. When the N signatories are identified, the third party identification service signs on the photograph. The identification result with the signed photograph is returned to each signatory for confirmation. At the same time, a comparison of the QR code is also carried out on each signatory's telephone to verify that the QR code on the photograph is identical to the one held by each signatory. When the QR code and the identity of each signatory are confirmed, at least one signature of at least one signatory is provided and the photograph can be directly recorded as a proof.

It is also possible to apply a hash function to the photograph to obtain a QR code associated with the photograph as a proof. The proof is recorded in a registry, either operated by a trusted third party or of a decentralized public type (such as the Bitcoin or Ethereum blockchain or any other decentralized transaction registry architecture referred to as a blockchain).

FIG. 3 illustrates a second embodiment of the method for electronic signing. In this embodiment, the signatories cannot all meet in the same place. Under this condition, an order of execution of the signatures is pre-established and accepted by all the signatories. According to the signature order, each signatory (S1, S2, S3, S4, Si . . . ) is switched between the active/inactive states at the times T1, T2, T3, T4 and Ti.

In the active state, a signatory is authorized to perform the step of validating, the step of acquiring the photograph, and the step of sending this photograph to others. In the inactive state, a signatory is limited to observing the development of the method for electronic signing.

Before the time T1, the signatory Si is in active state, which enables taking of a "selfie" photograph of his/her face with the QR code of the contract he/she is holding and to send it to the other signatories. Sending this photograph is equivalent to the electronic signing of S1's consent.

S1 has a right of withdrawal until the time T1, before which all other signatories are in an inactive state. After the time T1, S1 is switched to the inactive state and S2 enters the active state, whereas the states of the others do not change.

Once S2 has received and recognized the person on the photograph sent by S1, S2 confirms the identity of the person on the photograph. This confirmation starts the comparison of the QR code in the photograph with his/her own QR code stored in his/her phone. The confirmation of the QR code allows him/her to begin the step of taking a "selfie" photograph. The photograph of S2's face is added to S1's photograph with the same QR code to form proof of consent of both persons on the same document. The photograph with two faces is sent to the other signatories. Sending this photograph is equivalent to the electronic signing of S2's consent. Until the time T2, S2 has a right of withdrawal and all other signatories are in an inactive state. After the time T2, S2 is switched to the inactive state and S3 enters the active state, whereas the states of the others do not change.

S3 and the following other signatories repeat the step of validating, the step of acquiring the photograph, and the step of sending this photograph to the others according to the above rules. This method allows everyone to participate and witness the development of electronic signatures.

In this second embodiment, the times T1, T2 and T3 can be fixed times. It is also possible to take the time of sending the photograph as the time Ti in order to switch the signatories' states without delay.

The last signatory sends the photograph, on which all signatories' faces with a QR code are presented, to the third party service. The third party service can sign on this photograph. A hash print of the photograph thus signed is recorded in a registry, either operated by a trusted third party or of a decentralized public type (such as the Bitcoin or Ethereum blockchain or any other decentralized transaction registry architecture), which makes it possible to certify the validity of the contract signatures and thus make the process auditable and enforceable.

In addition, the step of acquiring the photograph involves the acquisition of a video sequence. Thus, the validation of the signatories' identities can use any type of identification method: face, voice, fingerprint based on a private or public database. It is also possible to verify the signatories' authorization by communicating with databases of the companies they represent.

Example of Implementation with a Physical Meeting of the Signatories

The method implemented in the event that all signatories physically meet includes the following steps:

Step 1: the n signatories of an agreement/document/contract meet. At least one of them shall be equipped with a telephone or tablet with a front camera with sufficient resolution to perform face recognition on the n faces.

Step 2: a hash print of the contract to be signed is made available to the signatories in the form of a QR code, either printed, or generated directly by their phones with a software for viewing the document, or received by the phones through a usual means of transmission (e.g., MMS or email).

Step 3: one of the n signatories makes sure that his/her phone is able to take selfies, to geolocate them, and asks the other n-1 to display the QR Code of the contract they agree to on their respective phones in order to make it visible on the selfie.

Step 4: the "selfie" is made (variant: it is a video sequence) and produces an image file containing metadata including the time-stamp and GPS coordinates of the image, possible identifiers of the terminal allowing, if necessary, to link it to its owner, . . . —it is transmitted by any electronic transmission means to a (in particular, face) third party identification/authentication service making it possible to certify the identity of the "contract" signatories and thus their simultaneous presence in the same place and their informed consent to proceed with the signing.

Step 5: Once the identification of the signatories has been established, the third party service signs the image enriched with identification metadata and transmits it to the signatories for cross-checking, if necessary, of the signing authority of each one.

Step 6: A hash print of the image signed in step 5 is recorded in a registry, either operated by a trusted third party or of a decentralized public type (such as Bitcoin' s blockchain or Ethereum's or any other decentralized transaction registry architecture) that allows to time-stamp and certify the valid signature of the contract and thus make the process auditable and enforceable.

The invention claimed is:

1. A method for electronic signing of a document by a plurality of signatories, comprising:
    a step of acquiring a photograph of at least one signatory of the plurality of signatories and identifying the signatory using the photograph,
    a step of associating the document in a digital form with the identified signatory using the photograph,
    a step of preliminarily calculating a matrix code by a cryptographic processing TC applied to the document being signed by the plurality of signatories,
    the step of acquiring a photograph including acquiring a photograph of the at least one signatory of the plurality of signatories bearing a physical medium representing the matrix code, wherein the matrix code is represented on a printed document or a screen of an electronic device in possession of the at least one signatory of the plurality of signatories when acquiring the photograph,
    a step of validating:
    the identity of the at least one signatory on the photograph, and
    conformity of the matrix code calculated by the cryptographic processing TC applied to the document being signed by the plurality of signatories with the matrix code on the photograph,
    the associating step comprising the transmitting a signature of at least one of the plurality of signatories on the document to a notarization server,
    repeating the steps of the method for electronic signing of the document by the plurality of signatories until at least two of the plurality of signatories have signed the document.

2. The method for electronic signing of a document by a plurality of signatories according to claim 1, wherein the photograph is taken in the presence of all the signatories and of at least one representation of the matrix code.

3. The method for electronic signing of a document by a plurality of signatories according to claim 1, wherein the photograph is taken in the presence of only some of the signatories and of at least one representation of the matrix code, then transmitted to the signatories not present on the photograph.

4. The method for electronic signing of a document by a plurality of signatories according to claim 3, wherein the step of validating the identity of the at least one signatory photographed by a signatory is carried out by activation of a recognition function by a signatory receiving the photograph of one or more other signatory(ies).

5. The method for electronic signing of a document by a plurality of signatories according to claim 3, wherein a signatory having taken the photograph transmits to at least one other signatory a digital file containing the photograph in a digital form, and a QR code displayed during the acquisition of the photograph.

6. The method for electronic signing of a document by a plurality of signatories according to claim 5, wherein the digital file further comprises time-stamp information on the acquisition of the photograph.

7. The method for electronic signing of a document by a plurality of signatories according to claim 1, wherein each signatory calculates, using his/her personal piece of equipment, the matrix code by applying the cryptographic processing TC to the document to be signed that he/she has at his/her disposal.

8. The method for electronic signing of a document by a plurality of signatories according to claim 1, wherein the matrix code is calculated by a single piece of equipment and transmitted to each of the signatories.

9. The method for electronic signing of a document by a plurality of signatories according to claim 5, wherein a digital file also includes geolocation information for a place of acquisition of the photograph.

10. The method for electronic signing of a document by a plurality of signatories according to claim 1, wherein the step of validating the identity of the at least one signatory photographed by another signatory or signatories is carried out by automatic face recognition.

11. The method for electronic signing of a document by a plurality of signatories according to claim 1, wherein the step of acquiring the photograph comprises acquisition of a video sequence.

* * * * *